US012283903B2

United States Patent
Fan et al.

(10) Patent No.: US 12,283,903 B2
(45) Date of Patent: Apr. 22, 2025

(54) MULTI-THREE-PHASE DRIVE SYSTEM

(71) Applicant: Hamilton Sundstrand Corporation, Charlotte, NC (US)

(72) Inventors: Boran Fan, Blacksburg, VA (US); Jagadeesh K. Tangudu, South Windsor, CT (US); Rolando Burgos, Blacksburg, VA (US); Vladimir Blasko, Avon, CT (US); Dong Dong, Blacksburg, VA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 137 days.

(21) Appl. No.: 18/352,343

(22) Filed: Jul. 14, 2023

(65) Prior Publication Data

US 2024/0097593 A1 Mar. 21, 2024

Related U.S. Application Data

(60) Provisional application No. 63/407,212, filed on Sep. 16, 2022.

(51) Int. Cl.
*H02P 5/46* (2006.01)
*H02K 11/33* (2016.01)
(Continued)

(52) U.S. Cl.
CPC .............. *H02P 27/06* (2013.01); *H02K 11/33* (2016.01); *H02P 29/50* (2016.02); *H02K 2213/03* (2013.01)

(58) Field of Classification Search
CPC .. H02P 27/06; H02P 29/50; H02P 5/74; H02P 27/085; H02P 25/22; H02K 11/33;
(Continued)

(56) References Cited

U.S. PATENT DOCUMENTS 6,850,032 B1 2/2005 Peterson
9,899,948 B2 2/2018 Butzmann et al.
(Continued)

FOREIGN PATENT DOCUMENTS

EP 3723279 A1 10/2020

OTHER PUBLICATIONS

An et al. "Capacitor lifetime extension in a hybrid active neutral-point-clamped inverter with reduction of DC-link ripple current and common-mode voltage" IEEE Access 9 (Mar. 2021): pp. 40336-40348.
(Continued)

*Primary Examiner* — Muhammad S Islam
(74) *Attorney, Agent, or Firm* — CANTOR COLBURN LLP

(57) ABSTRACT

A multi-three-phase motor drive system includes a power distribution network, a motor drive unit, and a motor network. The power distribution network includes a partitioned direct current (DC) link connected between a positive voltage rail and a negative voltage rail. A connection between the positive voltage rail and a mid-point node defines an upper portion of the partitioned DC link and a connection between negative voltage rail and the mid-point node defines a lower portion of the partitioned DC link. The motor drive unit includes a plurality of inverter units, and the motor network includes a plurality of motor windings which are each connected to a respective inverter unit. A first group of the inverter units is connected in parallel with the upper portion of the portioned DC link, and a second group of the inverter units is connected in parallel with the lower portion of the partitioned DC link.

17 Claims, 4 Drawing Sheets

(51) Int. Cl.
*H02P 27/06* (2006.01)
*H02P 29/50* (2016.01)

(58) Field of Classification Search
CPC ............ H02K 2213/03; H02M 1/0043; H02M 1/0074; H02M 1/008; H02M 1/123; H02M 1/15; H02M 7/53871
See application file for complete search history.

(56) References Cited

U.S. PATENT DOCUMENTS

| | | | |
|---|---|---|---|
| 10,594,227 B1* | 3/2020 | Blasko | H02P 27/16 |
| 11,063,531 B2 | 7/2021 | Han et al. | |
| 11,152,875 B2 | 10/2021 | Miyama et al. | |
| 11,171,594 B2 | 11/2021 | Jung | |
| 2007/0007928 A1* | 1/2007 | Shimozono | H02M 7/5387 |
| | | | 318/800 |
| 2009/0033251 A1* | 2/2009 | Perisic | B60L 15/007 |
| | | | 318/105 |
| 2010/0072928 A1 | 3/2010 | Welchko | |
| 2013/0271056 A1* | 10/2013 | Bunte | H02P 29/02 |
| | | | 318/503 |
| 2015/0349626 A1* | 12/2015 | Jiang | H02M 7/44 |
| | | | 363/39 |
| 2017/0033721 A1* | 2/2017 | Chai | H03K 17/567 |
| 2021/0362606 A1 | 11/2021 | White | |

OTHER PUBLICATIONS

Search Report issued in European Patent Application No. 23185575.0; Application Filing Date Jul. 14, 2023; Date of Mailing Feb. 20, 2024 (10 pages).

* cited by examiner

MULTI-THREE-PHASE DRIVE SYSTEM

CROSS-REFERENCE TO RELATED APPLICATIONS

This application claims the benefit of U.S. Provisional Application No. 63/407,212 filed Sep. 16, 2022, the disclosure of which is incorporated herein by reference in its entirety.

STATEMENT OF FEDERAL SUPPORT

This invention was made with government support under Government Contract No. DE-AR0001351 awarded by the Department of Energy. The government has certain rights in the invention.

BACKGROUND

The present disclosure relates to motor drive systems, and more particularly, to a multi-three-phase motor drive system with common-mode noise cancellation and reduced direct current (DC) ripple.

In typical motor drives, EMI filter and DC link capacitors are designed and sized to meet EMI and power quality standards and requirements. However, these passive components can contribute to over 60% of the total system weight and volume, drastically limit the system weight and volume density. Shrinking the size of passive components is especially critical for aviation applications, as the weight of the electrical components is crucial to system integration, as well as to meeting fuel efficiency and performance requirements.

BRIEF DESCRIPTION

According to some embodiments of the present disclosure, a multi-three-phase motor drive system includes a power distribution network, a motor drive unit, and a motor network. The power distribution network includes a positive voltage rail, a negative voltage rail, and a partitioned direct current (DC) link connected between the positive voltage rail and the negative voltage rail. The DC link includes a mid-point node connected between the positive voltage rail and the negative rail. The connection between the positive voltage rail and the mid-point node defines an upper portion of the partitioned DC link and the connection between negative voltage rail and the mid-point node defines a lower portion of the partitioned DC link. The motor drive unit is in signal communication with the power distribution network and includes a plurality of inverter units. Each of the inverter units includes a plurality of individual inverter devices. The motor network includes a plurality of motor windings, with each of the motor windings connected to a respective inverter unit included in the motor drive unit. A first group of the plurality of inverter units is connected in parallel with the upper portion of the portioned DC link, and a second group of the plurality of inverters is connected in parallel with the lower portion of the partitioned DC link.

In addition to one or more of the features described herein, or as an alternative, further embodiments of the multi-three-phase motor drive system may include a feature, wherein the upper inverter group includes a first upper inverter and a second upper inverter, and the lower inverter group includes a first lower inverter and a second lower inverter.

In addition to one or more of the features described herein, or as an alternative, further embodiments of the multi-three-phase motor drive system may include a feature, wherein each of the individual inverter devices includes a first input, a second input, an output, a first switch connected between the first input and the output, and a second switch connected between the second input and the output.

In addition to one or more of the features described herein, or as an alternative, further embodiments of the multi-three-phase motor drive system may include a feature, wherein the motor windings are implemented as electrically isolated three-phase windings.

In addition to one or more of the features described herein, or as an alternative, further embodiments of the multi-three-phase motor drive system may include a feature, wherein the motor windings include a first upper motor winding in signal communication with the first upper inverter unit, a second upper motor winding in signal communication with the second upper inverter unit, a first lower motor winding in signal communication with the first lower inverter unit, and a second lower motor winding in signal communication with the second lower inverter unit.

In addition to one or more of the features described herein, or as an alternative, further embodiments of the multi-three-phase motor drive system may include:
the first upper motor winding includes a first terminal connected to the output of a first inverter device included in the first upper inverter unit, a second terminal connected to the output of a second inverter device included in the first upper inverter unit, and a third terminal connected to the output of a third inverter device included in the first upper inverter unit;
the second upper motor winding includes a first terminal connected to the output of a first inverter device included in the second upper inverter unit, a second terminal connected to the output of a second inverter device included in the second upper inverter unit, and a third terminal connected to the output of a third inverter device included in the second upper inverter unit;
the first lower motor winding includes a first terminal connected to the output of a first inverter device included in the first lower inverter unit, a second terminal connected to the output of a second inverter device included in the first lower inverter unit, and a third terminal connected to the output of a third inverter device included in the first lower inverter unit; and
the second lower motor winding includes a first terminal connected to the output of a first inverter device included in the second lower inverter unit, a second terminal connected to the output of a second inverter device included in the second lower inverter unit, and a third terminal connected to the output of a third inverter device included in the second lower inverter unit.

In addition to one or more of the features described herein, or as an alternative, further embodiments of the multi-three-phase motor drive system may further comprise a controller in signal communication the power distribution network, the controller configured to generate a plurality of carrier signals and to output any of the carrier signals to each of the inverter units via the power distribution network.

In addition to one or more of the features described herein, or as an alternative, further embodiments of the multi-three-phase motor drive system may include a feature, wherein the plurality of carrier signals includes a first carrier signal (C0), a second carrier signal (C90) that is phase-shifted 90 degrees (90°) with respect to the first carrier signal (C0), a third carrier signal (C180) that is phase-shifted 180 degrees (180°) with respect to the first carrier signal (C0), and a fourth carrier signal (C270) that is phase-shifted 270 degrees (270°) with respect to the first carrier signal (C0).

In addition to one or more of the features described herein, or as an alternative, further embodiments of the multi-three-phase motor drive system may include a feature, wherein one of the motor windings is utilized as a winding angle reference to set winding displacement angles in relation to the remaining motor windings.

In addition to one or more of the features described herein, or as an alternative, further embodiments of the multi-three-phase motor drive system may include a feature, wherein the first upper motor winding is utilized as the winding angle reference such that second upper motor winding has a winding displacement angle of sixty degrees (60°), the first lower motor winding has a winding displacement angle of zero degrees (0°), and the second lower motor winding has winding displacement angle of sixty degrees (60°).

In addition to one or more of the features described herein, or as an alternative, further embodiments of the multi-three-phase motor drive system may include a feature, wherein the controller outputs the first carrier signal (C0) to the first upper inverter unit, outputs the first carrier signal (C0) to the second upper inverter unit, outputs the third carrier signal (C180) to the first lower inverter unit, and outputs the third carrier signal (C180) to the second lower inverter unit.

In addition to one or more of the features described herein, or as an alternative, further embodiments of the multi-three-phase motor drive system may include a feature, wherein the first upper motor winding is utilized as the winding angle reference such that second upper motor winding has a winding displacement angle of zero degrees (0°), the first lower motor winding has a winding displacement angle of sixty degrees (60°), and the second lower motor winding has winding displacement angle of sixty degrees (60°).

In addition to one or more of the features described herein, or as an alternative, further embodiments of the multi-three-phase motor drive system may include a feature, wherein the controller outputs the first carrier signal (C0) to the first upper inverter unit, outputs the third carrier signal (C180) to the second upper inverter unit, outputs the first carrier signal (C0) to the first lower inverter unit, and outputs the third carrier signal (C180) to the second lower inverter unit.

In addition to one or more of the features described herein, or as an alternative, further embodiments of the multi-three-phase motor drive system may include a feature, wherein the first upper motor winding is utilized as the winding angle reference such that second upper motor winding has a winding displacement angle of $\alpha$, the first lower motor winding has a winding displacement angle ranging from $\alpha$ to negative sixty degrees (−60°), and the second lower motor winding has winding displacement angle of sixty degrees (60°), where $\alpha$ is any angle in the range of zero degrees (0°) to sixty degrees (60°).

In addition to one or more of the features described herein, or as an alternative, further embodiments of the multi-three-phase motor drive system may include a feature, wherein the controller outputs the first carrier signal (C0) to the first upper inverter unit, outputs the second carrier signal (C90) to the second upper inverter unit, outputs the fourth carrier signal (C270) to the first lower inverter unit, and outputs the third carrier signal (C180) to the second lower inverter unit.

In addition to one or more of the features described herein, or as an alternative, further embodiments of the multi-three-phase motor drive system may include a feature, wherein the first upper motor winding is utilized as the winding angle reference such that second upper motor winding has a winding displacement angle of $\alpha$, the first lower motor winding has a winding displacement angle ranging from $\alpha$ to negative sixty degrees (−60°), and the second lower motor winding has winding displacement angle of sixty degrees (60°), where $\alpha$ is any angle in the range of zero degrees (0°) to sixty degrees (60°).

In addition to one or more of the features described herein, or as an alternative, further embodiments of the multi-three-phase motor drive system may include a feature, wherein the controller outputs the first carrier signal (C0) to the first upper inverter unit, outputs the fourth carrier signal (C270) to the second upper inverter unit, outputs the second carrier signal (C90) to the first lower inverter unit, and outputs the third carrier signal (C180) to the second lower inverter unit.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Various non-limiting embodiments of the present disclosure provide a multi-three-phase motor drive system capable of achieving common mode noise cancellation and ripple current reduction in motor drives. The multi-three-phase motor drive system includes a plurality of three-phase winding sets, where each three-phase winding set is connected a respective three-phase inverter. The electrically isolated three-phase windings can be implemented in a single motor or distributed among several individual motors. A plurality of phase-shifted carrier signals are then utilized to modulate the three-phase inverters to achieve complete common-mode voltage cancellation and a highly reduced DC ripple current. Accordingly, the multi-three-phase motor drive system of the present disclosure provides a solution which can significantly increase the drive system density and reduce the passive components by up to 80%, while achieving DC capacitor ripple current reduction of about 60% or great and a complete common-mode voltage cancellation.

Figure 1:
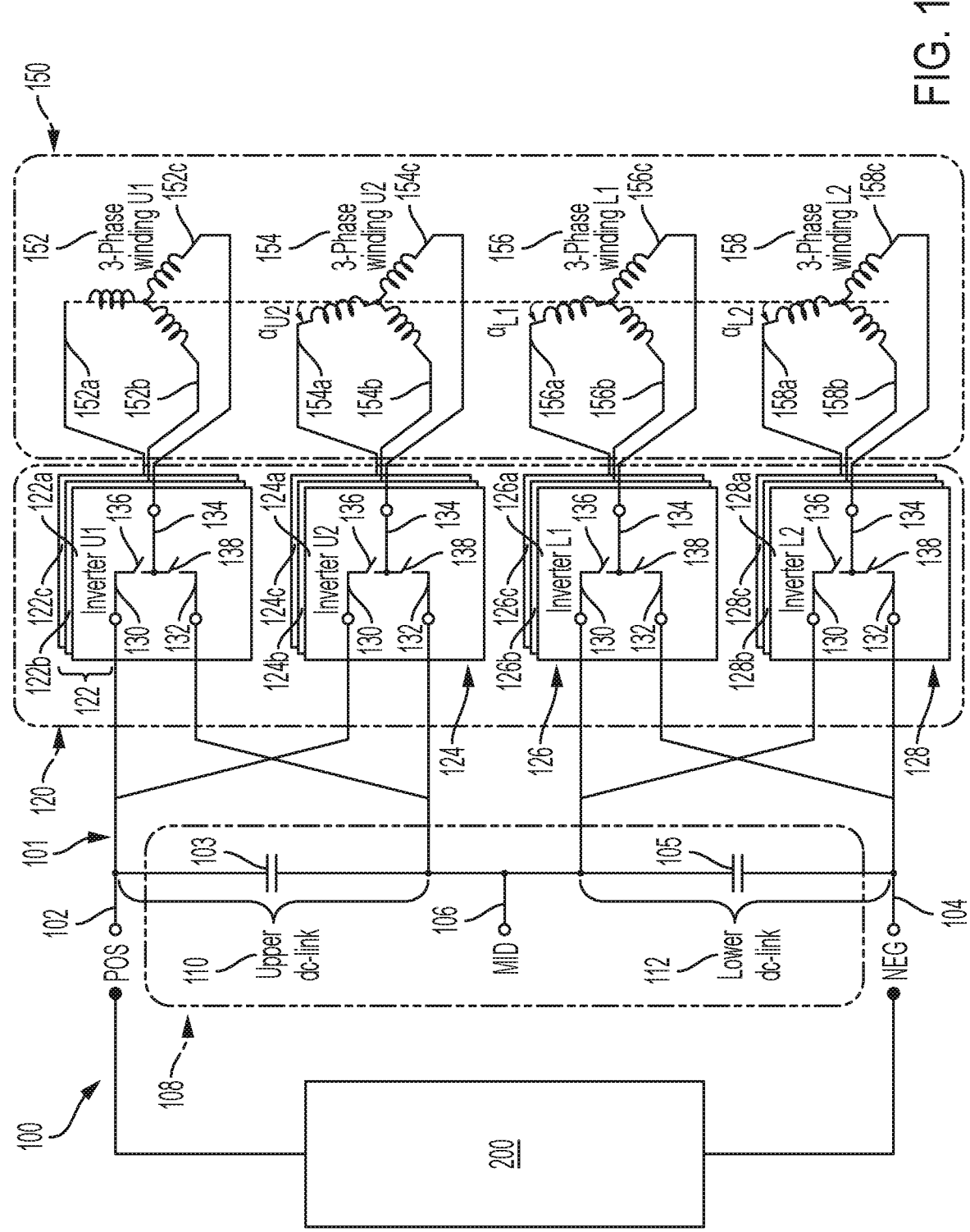
FIG. 1 is a schematic diagram of a multi-three-phase motor drive system with common-mode noise cancellation and reduced direct current (DC) ripple according to a non-limiting embodiment of the present disclosure.

With reference now to FIG. 1, a multi-three-phase motor drive system 100 is illustrated according to a non-limiting embodiment of the present disclosure. The multi-three-phase motor drive system 100 includes a power distribution network 101, a motor drive unit 120, a motor network 150, and a controller 200.

The power distribution network 101 includes a positive voltage rail 102, a negative voltage rail 104, and a partitioned direct current (DC) link 106 connected between the positive voltage rail 102 and the negative voltage rail 104. The partitioned DC link 106 includes a mid-point node 108 connected between the positive voltage rail 102 and the negative rail 104. The connection between the positive voltage rail 102 and the mid-point node 108 defines an upper portion 110 of the partitioned DC link 106 and the connection between negative voltage rail 104 and the mid-point node 108 defines a lower portion 112 of the partitioned DC link 106. The partitioned DC link 106 further includes an upper DC link capacitor 103 connected between the positive voltage rail 102 and the mid-point node 108, and a lower DC link capacitor 105 connected between the negative voltage rail 104 and the mid-point node 108.

The motor drive unit 120 is in signal communication with the power distribution network 101. The motor drive unit 120 includes a plurality of inverter units 122, 124, 126 and 128. Although four inverter units are shown, it should be appreciated the more or less inverter units can be implemented based on the number of motor windings included in the motor network 150. A first group of the plurality of inverter units is connected in parallel with the upper portion of the portioned DC link, and a second group of the plurality of inverters different from the first group is connected in parallel with the lower portion of the partitioned DC link. In one or more non-limiting embodiments, for example, the plurality of inverter units are arranged according to an upper inverter group and a lower inverter group. The upper inverter group is connected in parallel with the upper portion 110 of the portioned DC link 106 and includes a first upper inverter 122 and a second upper inverter 124. The lower inverter group is connected in parallel with the lower portion 112 of the partitioned DC link 106 and includes a first lower inverter 126 and a second lower inverter 128.

Each of the inverter units 122, 124, 126 and 128 includes a plurality of individual inverter devices 122a, 122b, 122c; 124a, 124b, 124c; 126a, 126b, 126c; and 128a, 128b, 128c. Each of the individual inverter devices includes a first input 130, a second input 132, and an output 134. A first switch 136 is connected between the first input 130 and the output 134, and a second switch 138 is connected between the second input 132 and the output 134. The switches 136 and 138 can be implemented using a variety of switches such as metal-oxide-semiconductor field-effect transistors (MOSFET), for example, or other transistors such as insulated-gate bipolar transistors (IGBTs).

The motor network 150 includes a plurality of motor windings 152, 154, 156, and 158. Each of the motor windings 152, 154, 156, and 158 is connected to a respective inverter unit 122, 124, 126 and 128 included in the motor drive unit 120. As illustrated in FIG. 1, the motor windings 152, 154, 156, and 158 are implemented as electrically isolated three-phase windings according to a non-limiting embodiment. A first motor winding 152 includes a first terminal 152a connected to the output 130 of a first inverter device 122a included in the first upper inverter unit 122, a second terminal 152b connected to the output 130 of a second inverter device 122b included in the first upper inverter unit 122, and a third terminal 152c connected to the output 130 of a third inverter device 122c included in the first upper inverter unit 122. A second motor winding 154 includes a first terminal 154a connected to the output of a first inverter device 124a included in the second upper inverter unit 124, a second terminal 154b connected to the output of a second inverter device 124b included in the second upper inverter unit 124, and a third terminal 154c connected to the output of a third inverter device 124c included in the second upper inverter unit 124. A third motor winding 156 includes a first terminal 156a connected to the output 130 of a first inverter device 126a included in the first lower inverter unit 126, a second terminal 156b connected to the output 130 of a second inverter device 126b included in the first lower inverter unit 126, and a third terminal 156c connected to the output 130 of a third inverter device 126c included in the first lower inverter unit 126. A fourth motor winding 158 includes a first terminal 158a connected to the output 130 of a first inverter device 128a included in the second lower inverter unit 128, a second terminal 158b connected to the output 130 of a second inverter device 128b included in the second lower inverter unit 128, and a third terminal 158c connected to the output 130 of a third inverter device 128c included in the second lower inverter unit 128.

Figure 2:
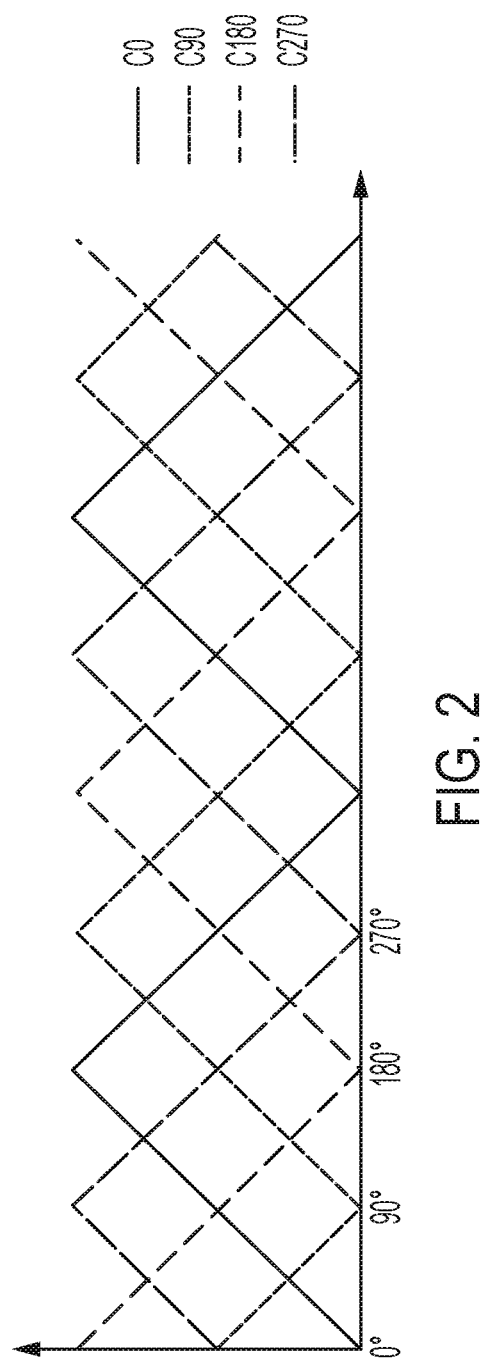
FIG. 2 is a signal diagram depicting carrier signals used to operate the multi-three-phase motor drive system illustrated in FIG. 1 according to a non-limiting embodiment of the present disclosure.

The controller 200 is in signal communication with the power distribution network 101. The controller 200 is configured to generate a plurality of carrier signals and can output any of the carrier signals to each of the inverter units 122, 124, 126 and 128 via the power distribution network 101. The carrier signals can be generated according to a discontinuous pulse-width modulation (PWM) technique or a continuous PWM technique. With reference to FIG. 2, the carrier signals include a first carrier signal (C0), a second carrier signal (C90) that is phase-shifted 90 degrees (90°) with respect to the first carrier signal (C0), a third carrier signal (C180) that is phase-shifted 180 degrees (180°) with respect to the first carrier signal (C0), and a fourth carrier signal (C270) that is phase-shifted 270 degrees (270°) with respect to the first carrier signal (C0).

With continued referenced to FIG. 1, the motor network architecture can be designed such that one of the motor windings, e.g., motor winding 152, is utilized as a winding angle reference to set winding displacement angles in relation to the remaining motor windings 154, 156 and 158. Based on the motor network architecture implemented in the system 100, the controller 200 can generate the corresponding carrier signals C0, C90, C180, C270 that operate the system 100 with zero common-mode voltage and a minimized the DC-link capacitor current ripple. Table 1 below lists various non-limiting motor network architectures that provide a multi-three-phase motor drive system that can achieve common-mode noise cancellation and reduced DC ripple.

TABLE 1

|  |  | System I | System II | System III | System IV |
|---|---|---|---|---|---|
| Inverter PWM techniques | | Discontinuous | Discontinuous | Continuous | Continuous |
| Inverter carrier | Inverter U1 | C0 | C0 | C0 | C0 |
|  | Inverter U2 | C0 | C180 | C90 | C270 |
|  | Inverter L1 | C180 | C0 | C270 | C90 |
|  | Inverter L2 | C180 | C180 | C180 | C180 |
| Winding displacement | $\alpha_{U2}$ | 60° | 0° | $\alpha$ | $\alpha$ |
|  | $\alpha_{L1}$ | 0° | 60° | $\alpha - 60°$ | $\alpha - 60°$ |
|  | $\alpha_{L2}$ | 60° | 60° | 60° | 60° |

$\alpha \in [0°, 60°]$

According to a first non-limiting motor network architecture (ARCH1), the first upper motor winding 152 is utilized as the winding angle reference such that second upper motor winding 154 has a winding displacement angle of sixty degrees (60°), the first lower motor winding 156 has a winding displacement angle of zero degrees (0°), and the second lower motor winding 158 has winding displacement angle of sixty degrees (60°). Based on the first non-limiting architecture, the controller 200 is set to output the first carrier signal (C0) to the first upper inverter unit 122, the first carrier signal (C0) to the second upper inverter unit 124, the third carrier signal (C180) to the first lower inverter unit 126, and the third carrier signal (C180) to the second lower inverter unit 128.

According to a second non-limiting motor network architecture (ARCH2), the first upper motor winding 152 is utilized as the winding angle reference such that second upper motor winding 154 has a winding displacement angle of zero degrees (0°), the first lower motor winding 156 has a winding displacement angle of sixty degrees (60°), and the second lower motor winding 158 has winding displacement angle of sixty degrees (60°). Based on the second non-limiting architecture, the controller 200 is set to output the first carrier signal (C0) to the first upper inverter unit 122, the third carrier signal (C180) to the second upper inverter unit 124, the first carrier signal (C0) to the first lower inverter unit 126, and the third carrier signal (C180) to the second lower inverter unit 128.

According to a third non-limiting motor network architecture (ARCH3), the first upper motor winding 152 is utilized as the winding angle reference such that second upper motor winding 154 has a winding displacement angle of $\alpha$, the first lower motor winding 156 has a winding displacement angle ranging from $\alpha$ to negative sixty degrees (−60°), and the second lower motor winding 158 has winding displacement angle of sixty degrees (60°), where $\alpha$ is any angle in the range of zero degrees (0°) to sixty degrees (60°). Based on the third non-limiting architecture, the controller 200 outputs the first carrier signal (C0) to the first upper inverter unit 122, the second carrier signal (C90) to the second upper inverter unit 124, the fourth carrier signal (C270) to the first lower inverter unit 126, and the third carrier signal (C180) to the second lower inverter unit 128.

According to a fourth non-limiting motor network architecture (ARCH4), the first upper motor winding 152 is utilized as the winding angle reference such that second upper motor winding 154 has a winding displacement angle of $\alpha$, the first lower motor winding 156 has a winding displacement angle ranging from $\alpha$ to negative sixty degrees (−60°), and the second lower motor winding 158 has winding displacement angle of sixty degrees (60°), where $\alpha$ is any angle in the range of zero degrees (0°) to sixty degrees (60°). Based on the fourth non-limiting architecture, the controller 200 outputs the first carrier signal (C0) to the first upper inverter unit 122, outputs the fourth carrier signal (C270) to the second upper inverter unit 124, outputs the second carrier signal (C90) to the first lower inverter unit 126, and outputs the third carrier signal (C180) to the second lower inverter unit 128.

Figure 3:
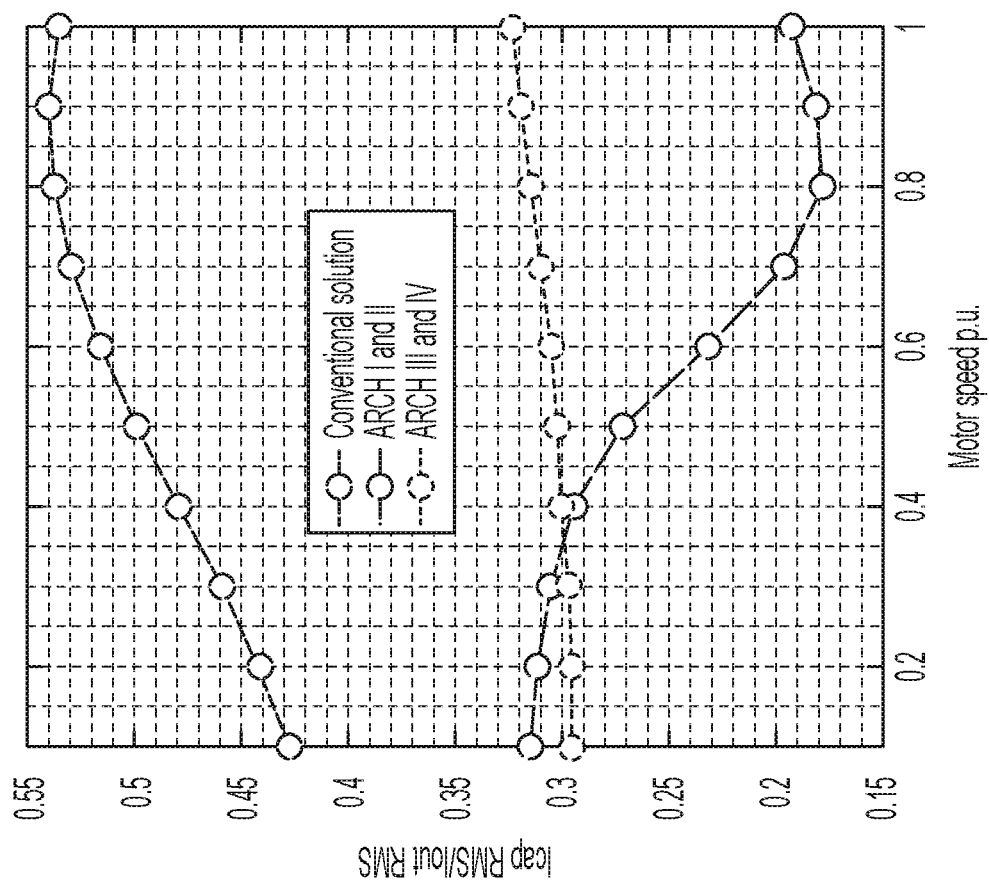
FIG. 3 is a graph depicting capacitor ripple current and common-mode voltage versus motor speed for a convention system compared to a multi-three-phase motor drive system according to a non-limiting embodiment of the present disclosure.

Any of the non-limiting motor network architectures described herein facilitates zero common-mode voltage and a minimized dc-link capacitor current ripple. FIG. 3, for example, is a graph depicting capacitor ripple current and common-mode voltage versus motor speed provided by a conventional motor drive system compared to the multi-three-phase motor drive system 100 implemented according to any of the non-limiting motor network architectures described in the present disclosure. As shown in FIG. 3, the multi-three-phase motor drive system according to one or more embodiments described herein can achieve significant capacitor ripple current reduction (up to 60%) over a wide motor speed range compared to conventional three-phase motor drive systems.

Figure 4:
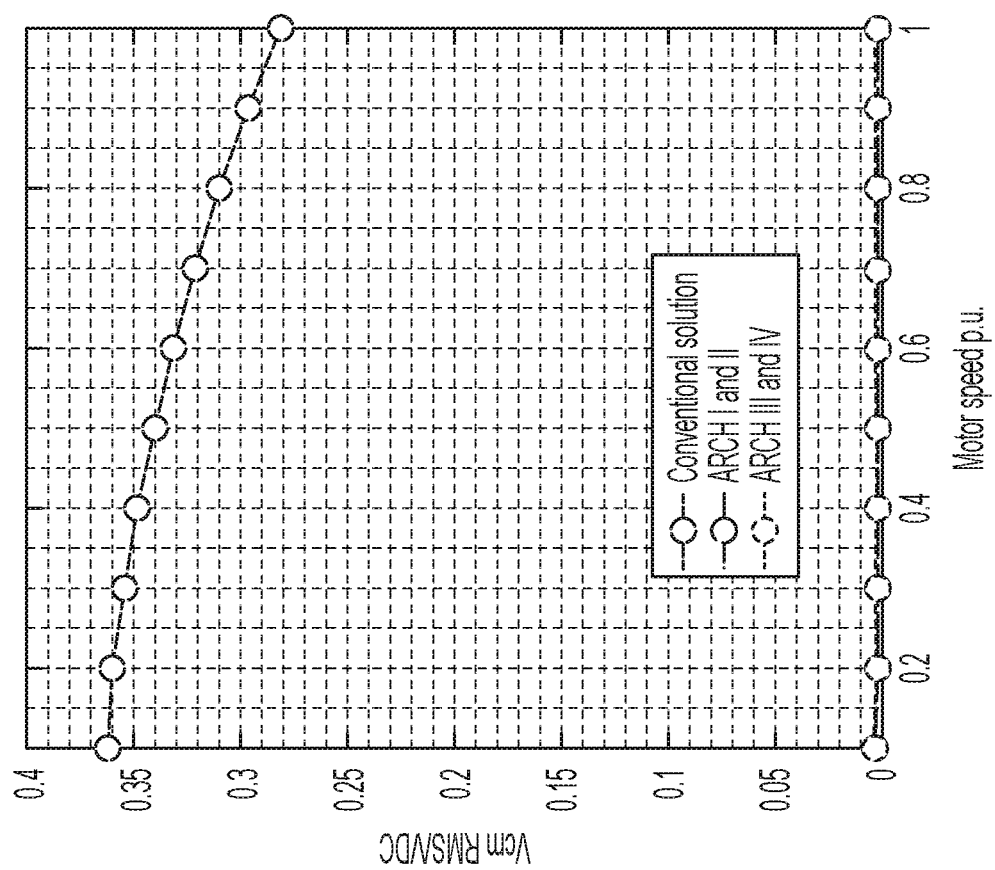
FIG. 4 is another graph depicting capacitor ripple current and common-mode voltage versus motor speed for a convention system compared to a multi-three-phase motor drive system according to a non-limiting embodiment of the present disclosure.

FIG. 4 is another graph depicting capacitor ripple current and common-mode voltage versus motor speed provided by a conventional motor drive system compared to the multi-three-phase motor drive system 100 implemented according to any of the non-limiting motor network architectures described in the present disclosure. As shown in FIG. 4, the multi-three-phase motor drive system 100 according to one or more embodiments described herein can achieve significant common-mode voltage reduction compared to conventional single three-phase solutions operating over a wide motor speed range.

As described herein, various non-limiting embodiments of the present disclosure provide a multi-three-phase motor drive system capable of achieving common mode noise cancellation and ripple current reduction in motor drives. The multi-three-phase motor drive system includes four three-phase winding sets, where each three-phase winding set is connected a respective three-phase inverter. The four electrically isolated three-phase windings can be implemented in a single motor or distributed among several individual motors. Four phase-shifted carrier signals are then utilized to modulate the four three-phase inverters to achieve complete common-mode voltage cancellation and a highly reduced DC ripple current. Accordingly, the multi-three-phase motor drive system of the present disclosure provides a solution which can significantly increase the drive system density and reduce the passive components by up to 80%, while achieving DC capacitor ripple current reduction of about 60% or great and a complete common-mode voltage cancellation.

The terms "about" and "substantially" are intended to include the degree of error associated with measurement of the particular quantity based upon the equipment available at the time of filing the application. For example, "about" or "substantially" can include a range of ±8% or 5%, or 2% of a given value. The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A multi-three-phase motor drive system comprising:
   a power distribution network including a positive voltage rail, a negative voltage rail, and a partitioned direct current (DC) link connected between the positive voltage rail and the negative voltage rail, the partitioned DC link including a mid-point node connected between the positive voltage rail and the negative rail, wherein a connection between the positive voltage rail and the mid-point node defines an upper portion of the partitioned DC link and a connection between negative voltage rail and the mid-point node defines a lower portion of the partitioned DC link;
   a motor drive unit in signal communication with the power distribution network and including a plurality of inverter units, each of the inverter units including a plurality of individual inverter devices; and
   a motor network including a plurality of motor windings, each of the motor windings connected to a respective inverter unit included in the motor drive unit,
   wherein a first group of the plurality of inverter units is connected in parallel with the upper portion of the portioned DC link, and a second group of the plurality of inverters is connected in parallel with the lower portion of the partitioned DC link.

2. The multi-three-phase motor drive system of claim 1, wherein the upper inverter group includes a first upper inverter and a second upper inverter, and the lower inverter group includes a first lower inverter and a second lower inverter.

3. The multi-three-phase motor drive system of claim 2, wherein each of the individual inverter devices includes a first input, a second input, an output, a first switch connected between the first input and the output, and a second switch connected between the second input and the output.

4. The multi-three-phase motor drive system of claim 3, wherein the motor windings are implemented as electrically isolated three-phase windings.

5. The multi-three-phase motor drive system of claim 4, wherein the motor windings include a first upper motor winding in signal communication with the first upper inverter unit, a second upper motor winding in signal communication with the second upper inverter unit, a first lower motor winding in signal communication with the first lower inverter unit, and a second lower motor winding in signal communication with the second lower inverter unit.

6. The multi-three-phase motor drive system of claim 5, wherein:
   the first upper motor winding includes a first terminal connected to the output of a first inverter device included in the first upper inverter unit, a second terminal connected to the output of a second inverter device included in the first upper inverter unit, and a third terminal connected to the output of a third inverter device included in the first upper inverter unit;
   the second upper motor winding includes a first terminal connected to the output of a first inverter device included in the second upper inverter unit, a second terminal connected to the output of a second inverter device included in the second upper inverter unit, and a third terminal connected to the output of a third inverter device included in the second upper inverter unit;
   the first lower motor winding includes a first terminal connected to the output of a first inverter device included in the first lower inverter unit, a second terminal connected to the output of a second inverter device included in the first lower inverter unit, and a third terminal connected to the output of a third inverter device included in the first lower inverter unit; and
   the second lower motor winding includes a first terminal connected to the output of a first inverter device included in the second lower inverter unit, a second terminal connected to the output of a second inverter device included in the second lower inverter unit, and a third terminal connected to the output of a third inverter device included in the second lower inverter unit.

7. The multi-three-phase motor drive system of claim 5, further comprising a controller in signal communication the power distribution network, the controller configured to generate a plurality of carrier signals and to output any of the carrier signals to each of the inverter units via the power distribution network.

8. The multi-three-phase motor drive system of claim 7, wherein the plurality of carrier signals includes a first carrier signal (C0), a second carrier signal (C90) that is phase-shifted 90 degrees (90°) with respect to the first carrier signal (C0), a third carrier signal (C180) that is phase-shifted 180 degrees (180°) with respect to the first carrier signal (C0), and a fourth carrier signal (C270) that is phase-shifted 270 degrees (270°) with respect to the first carrier signal (C0).

9. The multi-three-phase motor drive system of claim 8, wherein one of the motor windings is utilized as a winding angle reference to set winding displacement angles in relation to the remaining motor windings.

10. The multi-three-phase motor drive system of claim 9, wherein the first upper motor winding is utilized as the winding angle reference such that second upper motor winding has a winding displacement angle of sixty degrees (60°), the first lower motor winding has a winding displacement angle of zero degrees (0°), and the second lower motor winding has winding displacement angle of sixty degrees (60°).

11. The multi-three-phase motor drive system of claim 10, wherein the controller outputs the first carrier signal (C0) to the first upper inverter unit, outputs the first carrier signal (C0) to the second upper inverter unit, outputs the third carrier signal (C180) to the first lower inverter unit, and outputs the third carrier signal (C180) to the second lower inverter unit.

12. The multi-three-phase motor drive system of claim 9, wherein the first upper motor winding is utilized as the winding angle reference such that second upper motor winding has a winding displacement angle of zero degrees (0°), the first lower motor winding has a winding displacement angle of sixty degrees (60°), and the second lower motor winding has winding displacement angle of sixty degrees (60°).

13. The multi-three-phase motor drive system of claim 12, wherein the controller outputs the first carrier signal (C0) to the first upper inverter unit, outputs the third carrier signal (C180) to the second upper inverter unit, outputs the first carrier signal (C0) to the first lower inverter unit, and outputs the third carrier signal (C180) to the second lower inverter unit.

14. The multi-three-phase motor drive system of claim 9, wherein the first upper motor winding is utilized as the winding angle reference such that second upper motor winding has a winding displacement angle of $\alpha$, the first lower motor winding has a winding displacement angle ranging from $\alpha$ to negative sixty degrees (−60°), and the second lower motor winding has winding displacement angle of sixty degrees (60°), where $\alpha$ is any angle in the range of zero degrees (0°) to sixty degrees (60°).

15. The multi-three-phase motor drive system of claim 14, wherein the controller outputs the first carrier signal (C0) to the first upper inverter unit, outputs the second carrier signal (C90) to the second upper inverter unit, outputs the fourth carrier signal (C270) to the first lower inverter unit, and outputs the third carrier signal (C180) to the second lower inverter unit.

16. The multi-three-phase motor drive system of claim 9, wherein the first upper motor winding is utilized as the winding angle reference such that second upper motor winding has a winding displacement angle of $\alpha$, the first lower motor winding has a winding displacement angle ranging from $\alpha$ to negative sixty degrees (−60°), and the second lower motor winding has winding displacement angle of sixty degrees (60°), where $\alpha$ is any angle in the range of zero degrees (0°) to sixty degrees (60°).

17. The multi-three-phase motor drive system of claim 16, wherein the controller outputs the first carrier signal (C0) to the first upper inverter unit, outputs the fourth carrier signal (C270) to the second upper inverter unit, outputs the second carrier signal (C90) to the first lower inverter unit, and outputs the third carrier signal (C180) to the second lower inverter unit.

* * * * *